Mar. 20, 1923.
W. E. SPANGLER.
SIGNALING DEVICE FOR VEHICLES.
FILED JAN. 25, 1918.
1,449,070.
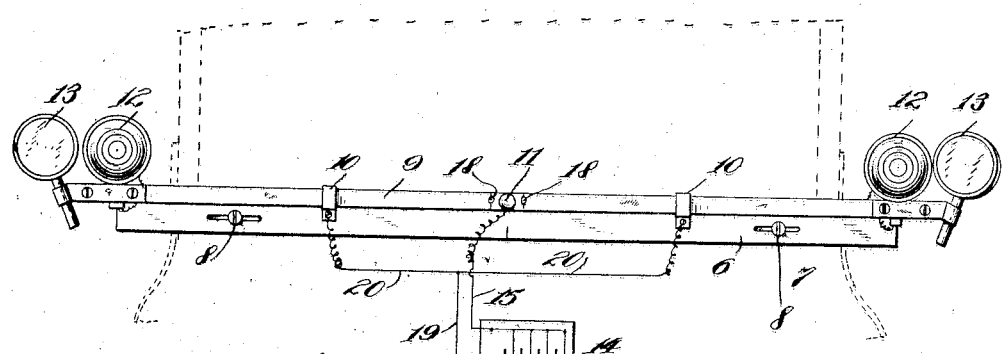
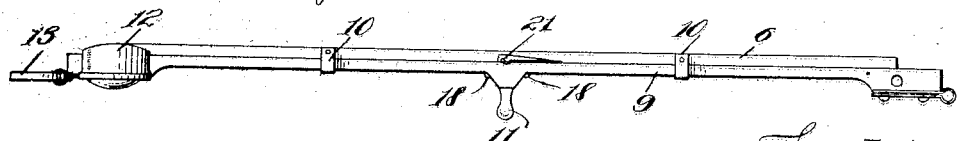
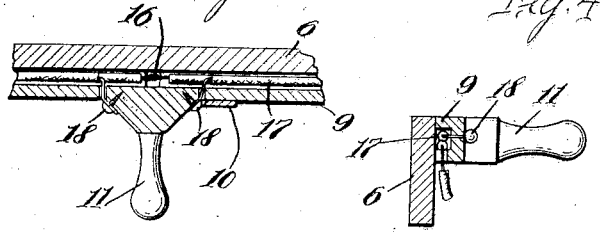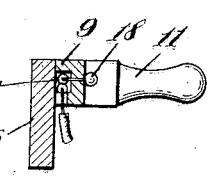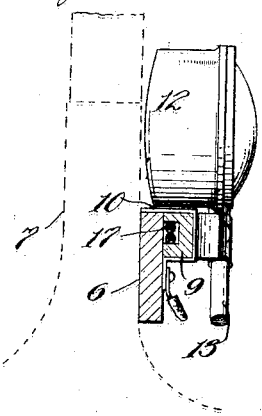
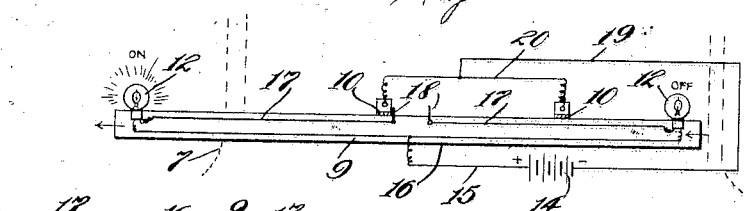
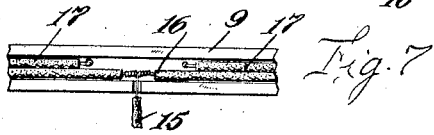
Inventor
Washington E. Spangler
By Hill, Smith, Brock, West
Attorney Patented Mar. 20, 1923.

1,449,070

UNITED STATES PATENT OFFICE.

WASHINGTON E. SPANGLER, OF ARLINGTON, VIRGINIA.

SIGNALING DEVICE FOR VEHICLES.

Application filed January 25, 1918. Serial No. 213,721.

*To all whom it may concern:*

Be it known that I, WASHINGTON E. SPANGLER, a citizen of the United States, residing at Arlington, in the county of Alexandria and State of Virginia, have invented certain new and useful Improvements in Signaling Devices for Vehicles, of which the following is a specification.

This invention relates to signaling devices of the character employed on automobiles for the purpose of indicating the direction to be taken by such vehicles.

The general objects of the invention are to provide a device of this character which can be readily applied to existing vehicles; which is convenient of operation; and which, though simple in construction and inexpensive of production, is efficient in operation. Further and more detailed objects of the invention will be set forth hereinafter.

In the drawings forming part hereof, Fig. 1 represents a front elevation of my device, portions of the vehicle to which it is attached being shown in dotted lines; Fig. 2 is a plan view of the device; Fig. 3 a sectional detail of the central portion of said device; Figs. 4 and 5 are views taken at right angles to Fig. 3; Fig. 6 is a diagrammatic plan view illustrating the manner in which the lighting circuits are controlled; and Fig. 7 is a detail in rear elevation of the device.

Referring specifically to the drawings, 6 indicates a relatively fixed supporting bar which is secured to the inner side of the dash 7 of the automobile, as by screws 8. Mounted upon the inner side of the bar 6 is a channel bar 9. The bar is slidable lengthwise on the bar 6, in straps 10 secured to the latter, whereby the bar 9 may be shifted in either direction, to a certain extent, by means of a handle 11 attached to the middle of the bar. Mounted upon brackets secured to the opposite ends of the bar are lamps 12, either of which may be illuminated by means to be described. These lamps show to the rear, and by lighting one or the other are intended to give notice to the driver of a following vehicle of a prospective turn or change of direction, to the right or the left, the right or left hand lamps being lighted accordingly. The bar 9 may also carry mirrors 13 if desired, so that the driver can see a following vehicle.

The electrical devices for lighting either lamp include the source of electricity indicated at 14. On one side this is connected by wires 15 and 16 to the lamps respectively, and the lamps are connected by wires 17 to contact terminals 18 which are mounted upon and carried by the sliding bar 9, conveniently beside the handle 11. For the most part these connections are inclosed within the hollow of the channel bar 9, which faces toward the supporting bar 6. On the other side the source of electricity 14 is connected by the wire 19 and branch wires 20 to the straps 10 which form the terminals adapted to close the circuit by contact with the corresponding terminals 18. 21 is a spring catch adapted to engage in a notch in the bar 9 and hold it in middle or neutral position.

In the operation of the device, assuming that the driver desires to indicate a turn to the left, he grasps the handle 11 and shifts the bar 9 to the left until the terminal 18 closes with the left hand terminal 10. This illuminates the left hand lamp 12, which by the movement of the bar 9 is shifted out to the left where it can be easily seen by a following driver. The lamp may show red to indicate the change of direction. The circuit may be traced from the source of current 14 through the connections 15 and 16, on the left hand side, to the lamp, and back through connection 17, contacts 18 and 10 and connections 20 and 19.

If a turn to the right is desired, the bar 9 is shifted to the right and the right hand lamp is projected and lighted accordingly. When the bar is in middle position, both the branch circuits are open and the lamps are dark.

The device may be readily attached to existing automobiles, and provides a simple means for accomplishing the results indicated. The bar 9 may be made of wood or other suitable material and the channel therein provides with the bar 6 an enclosure for the conductors 16, 17 and 19.

Having thus described my invention, what I claim is:—

A signal device comprising a support, a pair of guide straps on said support, a bar slidably mounted in said guide straps, a lamp at each end of said bar, spaced contacts on said bar between said straps, and an electric circuit including said lamps, guide straps, and contacts and adapted to be closed by the engagement of a contact with the guide strap to light one of said lamps.

In testimony whereof, I affix my signature.

WASHINGTON E. SPANGLER.